Nov. 12, 1935.  A. LINT  2,020,897
HEADLIGHT MOUNTING
Original Filed Sept. 18, 1933
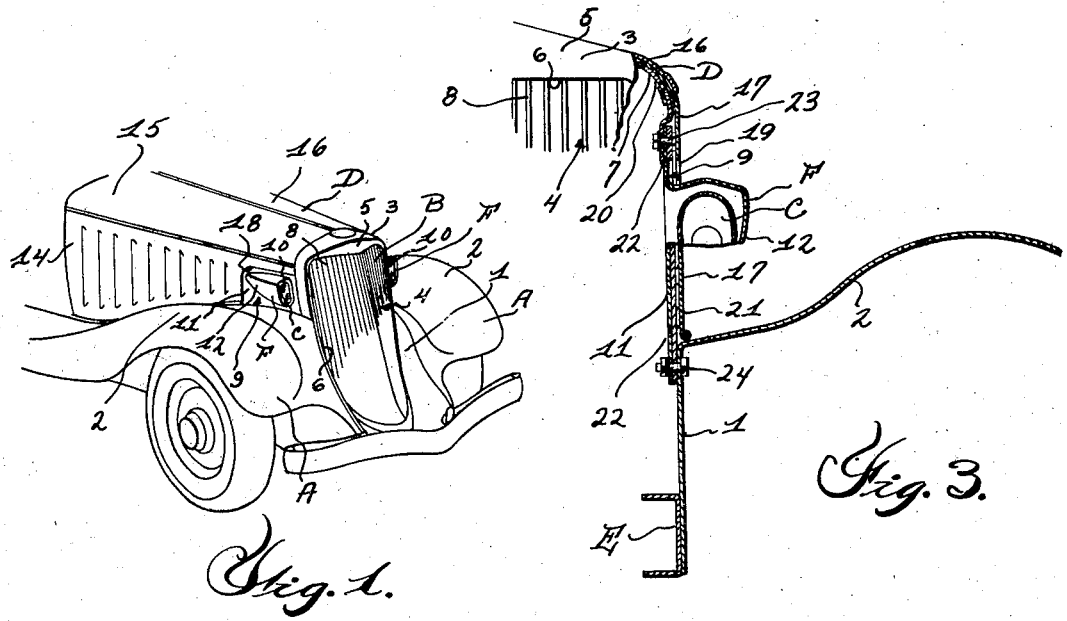
Fig. 1.
Fig. 3.
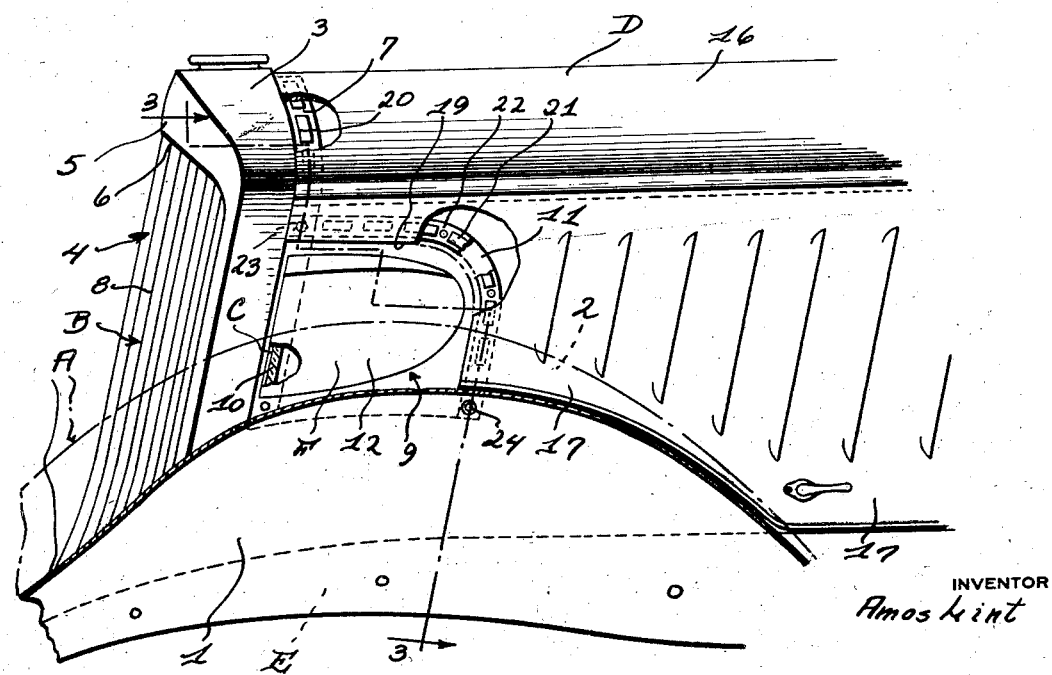
Fig. 2.
INVENTOR
Amos Lint
BY
ATTORNEYS Patented Nov. 12, 1935

2,020,897

UNITED STATES PATENT OFFICE 2,020,897

HEADLIGHT MOUNTING

Amos Lint, Toledo, Ohio, assignor to The City Auto Stamping Company, Toledo, Ohio, a corporation of Ohio Application September 18, 1933, Serial No. 690,000
Renewed May 15, 1935

10 Claims. (Cl. 240—7.1)

This invention relates generally to headlight mountings and refers more particularly to automobile headlight mountings.

One of the essential objects of the invention is to provide the headlights with mountings which simulate lateral projections of the engine hood of the automobile.

Another object is to provide the headlights with mountings which cooperate with a portion of the radiator shield of the automobile to form backers for the engine hood.

Another object is to provide the headlights with mountings which carry sound deadening material for cushioning portions of the engine hood.

Another object is to provide an assembly wherein certain of the anchorage means for the headlight mountings also serve as securing means for the sound deadening material.

Other objects, advantages and novel details of construction of this invention will be made more apparent as this description proceeds, especially when considered in connection with the accompanying drawing, wherein Figure 1 is a fragmentary perspective view of an automobile having headlight mountings embodying my invention;

Figure 2 is an enlarged fragmentary side elevation of the automobile with parts broken away and in section;

Figure 3 is a sectional view taken substantially on the line 3—3 of Figure 2.

Referring now to the drawing, A are the front fenders of the automobile; B is a radiator shield or guard between said fenders; C are headlights at opposite sides and just in rear of said shield; and D is an engine hood projecting rearwardly from said shield and disposed above and in rear of said headlights.

As shown, the fenders A have upright portions 1 secured to the sills E of the automobile and have suitable portions 2 projecting laterally from said upright portions at the upper edges thereof. The radiator shield B preferably comprises a shell 3 for receiving the usual radiator unit or core (not shown) and a grille 4 forming an auxiliary front for such unit. Preferably the shell 3 is provided in its front face 5 with a suitable opening 6 and is provided at its rear edge with an inwardly offset rearwardly projecting flange 7. The grille 4 covers the opening 6 in the shell and preferably comprises a series of laterally spaced upright bars 8. The headlights C are conventional in design and have housings F carried by the shield B and fenders A. Preferably each housing F comprises a stamping 9 and a lens 10. As shown, each stamping 9 comprises a flat plate 11 having an outwardly pressed rearwardly tapering portion 12. The plates 11 overlap and are fastened to the flange 7 at opposite sides of the shell. Such plates project rearwardly from said flanges and are also fastened to the upright portions 1 of the fenders. The lenses 10 close the open forward ends of the outwardly pressed portions 12 and are suitably secured thereto. The engine hood D comprises the hingedly connected sections 14, 15, 16 and 17, respectively, and is suitably connected to the shell 3. However, in the present instance, the lower side sections 14 and 17 of the hood are cut away as at 18 and 19, respectively, to receive the outwardly pressed portions 12 of the plates.

For cushioning the hood D, the usual sound deadening strip 20 is carried by the flange 7 of the shell and similar strips 21 are carried by metal straps 22 fastened to the plates 11 along their upper and rear edges. Preferably certain of the securing elements such as 23 and 24, respectively, used to fasten the plates 11 to the flange 7 and upright portion 1 are also employed to secure the straps 22 to the plates 11. Thus when the hood D is in closed position against the strips 20 and 21 the outwardly pressed portions 12 containing the headlights C simulate lateral projections of the side sections 14 and 17, respectively, of the hood. Moreover, the plates 11 not only carry the cushioning strips 21 for the hood sections 14 and 17 but also cooperate with the flange 7 to form backers for the hood.

The plates 11 constitute stationary closures for the orifices formed by the cut-out portions 18 of the hood sections 14 and 17. Thus the hood can be readily opened or closed without interference with the headlights and in closed position the plates 11 cooperate therewith to complete the closure.

What I claim as my invention is:

1. In combination, a radiator shield having a rearwardly projecting flange, an engine hood resting upon said flange and having an opening therein adjacent said shield, a fender beside the shield, and a headlight housing within said opening and fastened to said flange and fender.

2. In combination, a radiator shield having a rearwardly projecting flange, a fender beside the shield, and a headlight housing fastened to said flange and fender, a portion of said housing cooperating with the flange to form a backing for an engine hood.

3. In combination, a radiator shield having a rearwardly projecting flange, a fender beside the shield, and a plate fastened to said flange and fender and having an outwardly pressed portion for the reception of a headlight.

4. In combination, a radiator shield having a rearwardly projecting flange, a fender beside the shield, a headlight housing fastened to said flange and fender, and cushioning means for an engine hood on the flange and housing, certain of the fastening means for the housing serving as securing means for said cushioning means.

5. In combination, a radiator shield having a rearwardly projecting flange, a headlight housing fastened to said flange, and cushioning means for an engine hood on the flange and housing, certain of the fastening means for the housing serving as securing means for said cushioning means.

6. In combination, a radiator shield having a rearwardly projecting flange, and a plate fastened to said flange and having an outwardly pressed portion for the reception of a headlight.

7. In combination, an engine hood having an opening therein, a radiator shield in advance of the hood, and a plate fastened to the shield and having an outwardly pressed portion for the reception of a headlight extending through the opening beyond the hood and simulating a lateral projection of the hood.

8. In combination, an engine hood having an opening therein, a radiator shield in advance of the hood, a plate fastened to the shield and projecting rearwardly therefrom and forming a backing for the hood adjacent the opening, and a headlight housing projecting laterally from the plate through the opening in the hood beyond the outer side of and simulating a lateral projection of said hood.

9. In combination, an engine hood, a radiator shield in advance of said hood, one side of said hood being provided adjacent the shield with a transversely extending opening, and a headlight housing extending through said opening beyond said side of the hood and simulating a lateral projection upon the outer side of said hood, said headlight being provided upon the inner side of said hood with a portion that is secured to and constitutes a rearward extension of said shield.

10. In combination, a radiator shell, a headlight casing extending rearwardly and laterally of the shell, a hood having a hinged section for closing about said shell, a portion of said section being cut away to clear said headlight casing during opening and closing movement, and a plate in fixed relation to said shell and headlight casing forming a complementary closure for the cut-out portion of said hood.

AMOS LINT.